United States Patent [19]

Tanaka et al.

[11] 4,407,827

[45] Oct. 4, 1983

[54] METHOD FOR THE PRODUCTION OF BREAD

[75] Inventors: Kenji Tanaka, Kawagoe; Shigeru Endo, Tokyo, both of Japan

[73] Assignee: Nisshin Flour Milling Co., Ltd., Tokyo, Japan

[21] Appl. No.: 345,222

[22] Filed: Feb. 3, 1982

[30] Foreign Application Priority Data

Feb. 5, 1981 [JP] Japan ................................ 56-16546

[51] Int. Cl.$^3$ ............................................ A21D 8/02
[52] U.S. Cl. ...................................... 426/19; 426/504
[58] Field of Search .................................. 426/19, 504

[56] References Cited

U.S. PATENT DOCUMENTS

| 12,479 | 3/1855 | Crum | 426/19 |
| 691,749 | 1/1902 | Corby et al. | 426/19 |

*Primary Examiner*—Raymond N. Jones
*Assistant Examiner*—Elizabeth A. Hatcher
*Attorney, Agent, or Firm*—Abelman, Frayne & Rezac

[57] ABSTRACT

A process for producing a bread product comprising the steps of adding a portion of the required amount of water to wheat flour and yeast, kneading the mixture with pressure to form an intermediate dough, fermenting the dough and thereafter kneading said intermediate dough with the remaining amount of water necessary to obtain the desired dough and baking same.

4 Claims, No Drawings

METHOD FOR THE PRODUCTION OF BREAD

The present invention relates to a method for the production of bread of the better quality.

Heretofore, many attempts have been made to have an increased volume of bread with improved outer appearance and taste. Most of such attempts were directed to use of any additives; i.e. various additives as wheat flour-improving agents are added to a bread dough which is then subjected to baking procedures. The prior art methods can, however, not always give a satisfactory result. Further, the recent trend of the art is to avoid use of any synthetic additives which are not welcomed by consumers.

Various studies have been done by us to find a method for the preparation of bread of the better quality, without relying on use of any additives. It has now been found that in the preparation of a bread dough, water is added in at least two divided portions to wheat flour, wherein the wheat flour-water mixture obtained after the addition of the first portion of water is kneaded with pressing to form a flat dough (hereinafter called as "an intermediate dough" for convenience), which is then kneaded with the remaining portion of water to obtain a dough subject to a baking process.

More detailed explanation is given below. The prior art methods for the production of bread can be classified to two methods, i.e. a straight dough method and a sponge dough method. In the former, 100 parts of wheat flour and 65-75 parts of water are kneaded with yeast, flavor and other additives to form a bread dough, which is then added with shortening and further kneaded, followed by fermentation and heating to produce bread. In the latter, a portion, e.g., 70 parts, of the total wheat flour is added with 40-45 parts of water and yeast, and the resulting mixture is kneaded and fermented to have a sponge dough once, which is then kneaded with the remaining portion (30 parts) of wheat flour and 25-30 parts of water, as well as flavor and other additives, thereby to form a dough which is further kneaded with shortening and baked to obtain a bread. In the prior art methods, thus, the formation of a bread dough in a straight dough method or the formation of a sponge dough or a final dough in a sponge dough method is carried out by adding the required amount of water at once to wheat flour.

In contrast to such prior art methods, the present invention is a bread-making process which comprises adding a portion of the required amount of water to wheat flour and kneading the mixture with pressure to form an intermediate dough with the moisture content of 20-50 wt.% preferably in a flat form, which is then added with the remaining amount of water and kneaded once again to form a dough.

In the prior art method, the straight dough should usually contain 65-75 parts of water per 100 parts of wheat flour. In the present invention, 25-50 parts, preferably 30-40 parts of water is added to 100 parts of wheat flour and the mixture is kneaded with pressure (as by means of a pair of rolls) to produce an intermediate dough preferably in a flat form, and thereafter the intermediate dough is added with 15-50 parts of water and kneaded again to obtain a desired straight dough ready for baking procedures.

When the present invention is applied to a sponge dough method, the formation of an intermediate dough which is the characteristic of the invention may be carried out at either the step of sponge dough formation or the step of final dough formation. It is also possible to form the intermediate dough at both steps.

In carrying out the intermediate dough formation at the step of sponge dough formation, 70 parts of wheat flour combined with 17-35 parts or preferably 21-28 parts of water (the usual amount of water being as much as 40-45 parts) are subject to roll pressing thereby to form a preferably flat intermediate dough having the moisture content of 25-50% or preferably 30-40% based on the weight of wheat flour, which is then added with the remaining amount (5-23 parts) of water and kneaded again to form a sponge dough. This dough is then fermented and thereafter kneaded together with 30 parts of wheat flour, 25 parts of water, an appropriate amount of flavor and the like to yield a final dough.

If the present invention is applied to the step for a final dough formation, a sponge dough (which comprises 70 parts of wheat flour, 40 parts of water and a suitable amount of yeast) is first prepared and fermented according to a usual method, and separately, an intermediate dough (having the moisture content of 25-50%) in the flat form is prepared by kneading 30 parts of wheat flour and 7-15 parts of water. The intermediate dough is then kneaded with the remaining amount, 10-18 parts, of water and thereafter combined with a sponge dough and the required flavor to form a final dough [which retains 65 parts (=40+7-15+-18-10) of water per 100 parts (=70+30) of wheat flour]. In that occasion, the remaining amount of water may be added to the sponge dough, or the flavor and the like may be combined to the sponge dough prior to its preparation.

The term "bread" as used herein means the product obtained by baking a dough obtained by combining wheat flour, baker's yeast, water and any other materials together, which may further comprise any other crop like rye than wheat flour.

In the present invention, a portion of water required for dough formation is added to wheat flour and kneaded with pressing to form an intermediate dough having the moisture content of 25-50% by weight. In this case, any auxiliary materials like sugar, salt, skim milk, etc. may be added together. If water is added beyond the above-indicated amount, the internal phase of the bread produced will be poor and the volume also will be insufficient. If the amount of water used is excessively low, the dough becomes short of fermentation resistance, which will yield bread with the less volume and poor appearance. To form an intermediate dough from wheat flour and water, any known means can be employed without limitation, so far as both are mixed with pressing to form a substantially homogeneous dough. Specifically, the mixture of wheat flour and water can be kneaded manually, or it can be supplied to an extruder. Alternatively, wheat flour and water are supplied to a mixer for noodles or bread to obtain a fluffy mass, which is then pressed through a pair of rolls or between plates. The last-mentioned way is particularly convenient because it can give a dough of the flat form. When a pair of rolls is employed, the roll clearance should better be controlled to give an intermediate dough of 1-5 mm thick. If the intermediate dough is too thick, it becomes difficult to prepare by addition of water to the intermediate dough a desired bread dough which will yield bread of poor quality. If the intermediate dough is too thin, the final dough is lacking of fermentation resistance with yielding bread of insufficient volume and poor quality.

To the thus obtained intermediate bread, the remaining amount of water is added to produce a desired dough having suitable consistency as bread dough. Any auxiliary materials may be added at this stage. Final mixing of the intermediate dough with water can be carried out by means of any known device for obtaining bread dough. For example, a bread-making mixer is convenient.

The bread dough thus prepared is subjected to a usual backing method including fermentation and heating.

According to the present invention, it is possible to obtain bread of sufficient volume, even without using any oxidizing additives. The internal phase (cross section of bread), outer phase (baked color, state of surface), finger touch, etc. also are satisfactory.

EXAMPLE 1

(Straight dough method)

2000 g of wheat flour, 100 g of sugar, 40 g of salt, 40 g of skimmed milk and 700 cc of water (about a half of the required amount) are supplied to a noodle-making mixer and mixed for 10 minutes. The resulting fluffy mass is passed through a series of three pairs of rolls each having a roll gap of 3.4 mm, 2.0 mm and 1.2 mm, thereby to obtain a belt-like dough of 1.5 mm thick (with the moisture content of about 30% by weight based on the weight of wheat flour). Then, the belt-like dough is cut into noodles each having a width of 2 mm. To this, 700 cc of water (the remaining half of the required amount) and 40 g of baker's yeast, and the resulting mixture is supplied to a bread-making mixer. After mixing for 15 minutes, a bread dough is obtained. After addition of 100 g of shortening, the dough is baked according to the preparatory conditions set forth below.

[Preparatory Conditions]

First fermentation: 90 min. at 27° C.
Second fermentation: 30 min. at 27° C.
Drier: 40 min. at 37° C.
Baking: 35 min. at 217° C.

EXAMPLE 2

(Sponge dough method)

1400 g of wheat flour and 490 cc (61% of the required amount) of water are fed to a bread-making mixer and mixed for 10 minutes. The resulting fluffy mass is passed through a pair of rolls with a roll gap of 3.4 mm to have a belt-like dough of 4.5 mm thick (with the moisture content of 35% based on the weight of wheat flour). To the dough, 310 cc (the remainder, 39% of the required amount) of water and 40 g of baker's yeast are added, and the total mass is supplied to a bread-making mixer wherein mixing is effected for 7 minutes. The resulting bread dough is fermented for 4 hours at 27° C. and added with 600 g of wheat flour, 100 g of sugar, 40 g of salt, 40 g of skimmed milk and 500 cc of water. The total mass is mixed for 5 minutes and added with 100 g of shortening. After mixing for additional 8 minutes, it is baked according to the conditions set forth below:

[Baking conditions]

Floor time: 20 min.
Bench Time: 20 min.
Drier: 40 min. at 37° C.
Baking: 35 min. at 217° C.

EXAMPLE 3

300 g of wheat flour and 150 cc of water are manually kneaded and rolled by means of wooden rods to have a dough of 2 mm thick (with the moisture content of 50% based on the weight of wheat flour). Then, the dough is cut to noodles by means of a knife. It is mixed with 6 g of baker's yeast, 9 g of sugar, 4.5 g of salt, 6 g of shortening and 60 cc of water in a mixer. The resulting dough is baked according to the procedures mentioned in Example 1.

EXAMPLE 4

300 g of wheat flour, 9 g of sugar, 4.5 g of salt, 6 g of shortening and 90 cc of water are supplied to an extruder with a die of 5 mm diameter. The noodle-like dough obtained has the moisture content of 30% based on the weight of wheat flour. To this, 6 g of baker's yeast dissolved in 126 cc of water is added, and the mixture is mixed in a mixer. The resulted dough is baked according to the procedures mentioned in Example 1.

EXAMPLE 5

1400 g of wheat flour and 350 cc of water are mixed in a noodle-making mixer for 10 minutes. The resulting fluffy mass is passed through a pair of rolls with a gap of 20 mm to obtain a belt-like dough of 3.5 mm thick (with the moisture content of 25% based on the weight of wheat flour). Water (70 cc) is added to this dough, which is mixed again in a bread-making mixer for 10 minutes. The resulted dough is passed through a pair rolls with a gap of 3.5 mm to obtain a belt-like dough of 4.5 mm thick (with the moisture content of 30% based on the weight of wheat flour). To this, 380 cc of water and 40 g of baker's yeast are added, and they are mixed in a bread-making mixer for 10 minutes. The sponge dough obtained is fermented at 27° C. for 4 hours.

Separately, 600 g of wheat flour, 150 cc of water, 100 g of sugar, 40 g of salt, 40 g of skimmed milk and 100 g of shortening are mixed in a noodle-making mixer for 10 minutes. The fluffy mass obtained is passed through a pair of rolls with a gap of 3.0 mm to obtain a belt-like dough of 4.0 mm thick (with the moisture content of 25% based on the weight of wheat flour). This dough, together with 350 cc of water and the fermented sponge dough, is mixed in a bread-making mixer for 13 minutes. The dough obtained is baked in the same manner as in Example 2.

EXAMPLE 6

1400 g of wheat flour, 800 cc of water and 40 g of baker's yeast are mixed in a bread-making mixer for 4 minutes to obtain a sponge dough which is then fermented at 27° C. for 4 hours. The thus obtained dough, together with the belt-like dough obtained in the latter part of Example 5 and 350 cc of water, is mixed in a bread-making mixer for 13 minutes to obtain a final dough which is then baked in the same manner as in Example 2.

In order to demonstrate the technical effect of the present invention, bread is prepared by using different methods and the quality of such products are compared.

[Method of Preparation]

Present invention (1):
Same as in Example 1
Comparison (1):

To the starting materials of Example 1, 1400 cc of water is added instead of 700 cc of water and mixed in a bread-making mixer. The resulting dough is treated in the same manner as in Example 1.

Present invention (2):

Same as in Example 2

Comparison (2):

To the starting materials of Example 2, 800 cc of water and 40 g of baker's yeast are added instead of 490 cc of water, and mixed in a bread-making mixer. The resulting dough is treated in the same manner as in Example 2 to obtain bread.

| | Volume (cc) | Internal phase | Outer phase | Finger touch |
|---|---|---|---|---|
| Present invention (1) | 1950 | ◎ | ○ | ◎ |
| Comparison (1) | 1840 | xx | xx | xx |
| Present invention (2) | 2090 | ○ | ○ | ○ |
| Comparison (2) | 1820 | xx | xx | xx |

(Note)
◎ Good
○ Almost good
x Poor (no commercial value)
xx Bad

What we claim is:

1. In a process for producing a bread dough suitable for making bread wherein the flour is mixed with water, yeast and other additives to form a bread dough and then fermented before baking, the improvement comprising preparing the dough by adding to wheat flour a part of the required amount of water for formation of said dough and kneading the resulting mixture with pressure thereby to form an intermediate dough having the moisture content of 25-50% by weight based on the weight of the wheat flour, fermenting the intermediate dough and then kneading, said fermented intermediate dough with the remaining amount of water necessary to obtain the desired dough.

2. A process for producing bread wherein the dough, according to claim 1, is subsequently baked.

3. A process according to claim 2 wherein the dough is a straight dough.

4. A process according to claim 2 wherein the dough is a sponge dough.

* * * * *